(12) United States Patent
Bronstein et al.

(10) Patent No.: US 8,132,928 B2
(45) Date of Patent: Mar. 13, 2012

(54) STRETCHED MEMBRANE SOLAR COLLECTOR

(75) Inventors: Allen I. Bronstein, Inverness, CA (US); Howard Harrenstien, Miami, FL (US)

(73) Assignee: Focal Point Energy, Inc., San Jose, CA (US)

( * ) Notice: Subject to any disclaimer, the term of this patent is extended or adjusted under 35 U.S.C. 154(b) by 94 days.

(21) Appl. No.: 12/353,157

(22) Filed: Jan. 13, 2009

(65) Prior Publication Data

US 2009/0180203 A1 Jul. 16, 2009

Related U.S. Application Data

(60) Provisional application No. 61/020,933, filed on Jan. 14, 2008.

(51) Int. Cl.
*F24J 2/52* (2006.01)
*F24J 2/12* (2006.01)

(52) U.S. Cl. ........................................ 359/846; 126/696

(58) Field of Classification Search .......... 126/683–695; 359/846, 847, 853
See application file for complete search history.

(56) References Cited

U.S. PATENT DOCUMENTS

| | | | | | |
|---|---|---|---|---|---|
| 4,106,484 | A | * | 8/1978 | Dame | 126/696 |
| 4,127,926 | A | * | 12/1978 | White | 29/453 |
| 4,268,332 | A | * | 5/1981 | Winders | 156/160 |
| 4,293,192 | A | * | 10/1981 | Bronstein | 359/846 |
| 4,493,313 | A | * | 1/1985 | Eaton | 126/570 |
| 4,510,923 | A | * | 4/1985 | Bronstein | 126/696 |
| 4,571,812 | A | * | 2/1986 | Gee | 29/445 |
| 4,596,238 | A | * | 6/1986 | Bronstein | 126/684 |
| 4,620,382 | A | * | 11/1986 | Sallis | 38/102.2 |
| 5,071,243 | A | * | 12/1991 | Bronstein | 359/867 |
| 2009/0178669 | A1 | * | 7/2009 | Bronstein et al. | 126/684 |

* cited by examiner

*Primary Examiner* — Mark Consilvio
(74) *Attorney, Agent, or Firm* — Jill L. Robinson

(57) ABSTRACT

An improved solar reflector utilizing a tensioned reflective membrane. The reflector structure includes a membrane attached on the outer surface of a metal strap that is positioned on an end form by means of a curved-face tensioning block.

3 Claims, 3 Drawing Sheets

STRETCHED MEMBRANE SOLAR COLLECTOR

CROSS-REFERENCE TO RELATED APPLICATIONS

This invention is a continuation-in-part of provisional patent application 61/020,933, which is incorporated by reference herein.

BACKGROUND OF THE INVENTION

The invention relates to a new method of design and construction of linear tensioned membrane solar reflectors for solar parabolic trough concentrators, solar linear reflectors, and linear heliostats for solar Fresnel reflecting systems, in particular those that utilize thin flexible films for the membrane substrate.

Linear tensioned membrane reflectors have many advantages over more traditional designs incorporating ridged frame structures. They are relatively light and easy to assemble. In part because of the light weight, multiple reflectors can be mounted on a single frame structure which can be balanced on pillow block bearings allowing for tilting adjustments to be made with minimal energy expended.

Trough-shaped linear tensioned membrane reflectors, such as those shown in U.S. Pat. No. 4,293,192, issued Oct. 6, 1981, to Allen I. Bronstein and U.S. Pat. No. 4,510,923, issued Apr. 16, 1985 to Allen I. Bronstein, usually comprises a frame structure with parallel-facing identical end form members, each describing the desired cross-sectional shape of the reflector. A membrane of highly reflecting material, such as metalized reflective plastic film, is wrapped tightly around the edges of the form members and the membrane. The membrane is then placed under 1000 to 7000 pounds per square inch (PSI) of tension in one direction, usually by moving one of the end form members away from the other.

However, linear tensioned membrane reflector technology presents certain problems that do not exist for linear solar reflector technologies constructed with a rigid structural frame structures, especially when the device utilizes certain materials or laminates, such as plastic films, as the membrane's substrate. For example, Mylar (Biaxially-oriented polyethylene terephthalate boPET polyester film) is a dimensionally stable material that reacts in undesirable ways when the film is placed under compression. A typical means of mounting the membrane is to adhere it to the underside of a metal strap with a structural adhesive, such as epoxy. The strap is then wrapped around the end form and clamped in place. However, as the strap is bent around the end form the strap's inward facing surface and the membrane are placed in compression, wrinkles are produced; they are then crushed and locked in place as the strap is tightened on the end form. These distortions in the film are magnified by the film and transmitted into the membrane as large longitudinal wrinkles and ripples that span across the entire membrane's surface, distorting its shape.

It is an objective of this invention to reduce the wrinkles and other shape distortions that may occur when thin films are used as a membrane substrate in tensioned membrane solar reflectors.

BRIEF SUMMARY OF THE INVENTION

The present invention teaches attaching the membrane to the outside of the strap so that when the strap is bent around the end form the membrane is placed under lateral tension rather than lateral compression. A curved attachment block is preferably used to eliminate improper curvatures and edge distortions in the membrane that could be caused by using a flat-faced attachment block. Further, the potential loss of structural integrity caused by not having the membrane sandwiched between the end form and the strap can be ameliorated by wrapping the end of the membrane longitudinally around the strap and attaching the membrane to the inner surface of the strap as well. Slits, notches or other cut-outs along the edge of the membrane that is attached to the inner surface of the strap eliminate bunching and/or wrinkles that could affect the seating of the strap and membrane on the end form.

BRIEF DESCRIPTION OF THE SEVERAL VIEWS OF DRAWINGS

DETAILED DESCRIPTION OF THE INVENTION

Figure 1:
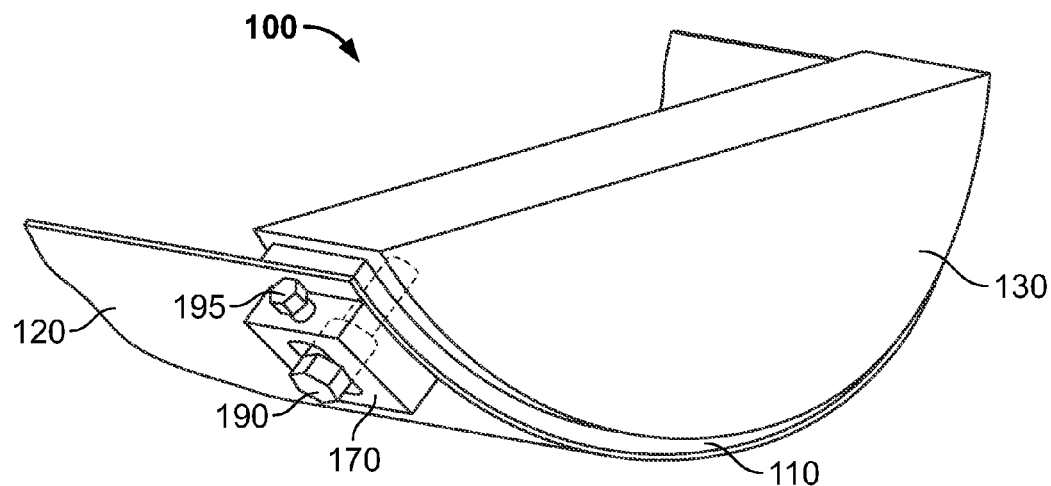
FIG. 1 shows a perspective view of an embodiment of the invention utilizing the tensioning block.
Figure 2:
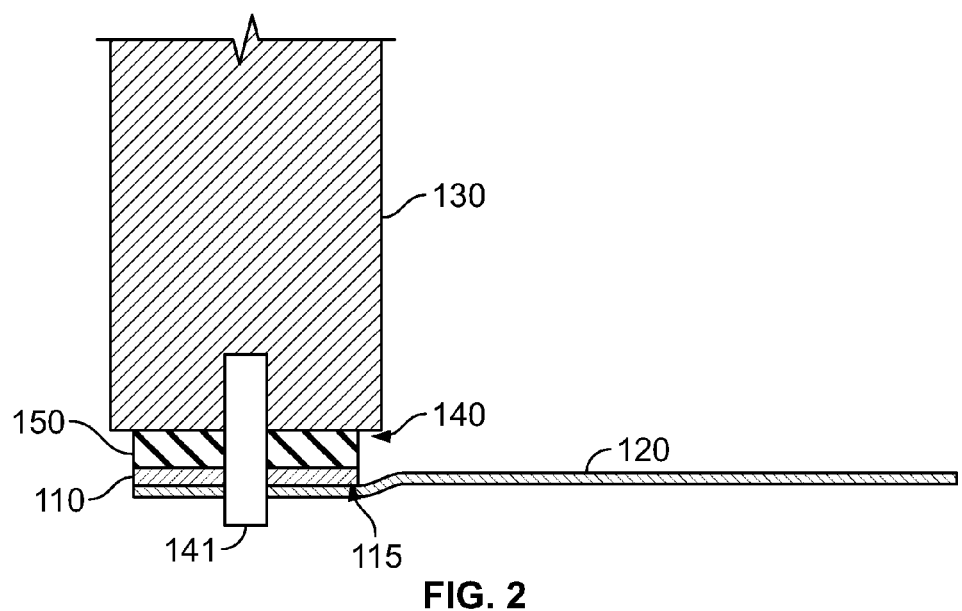
FIG. 2 shows a cutaway of the center of the strap lying along the end form.
Figure 3:
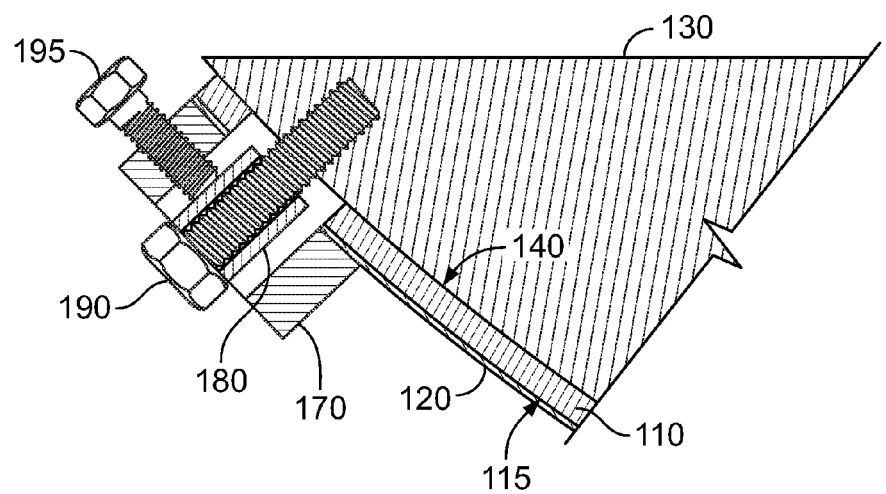
FIG. 3 shows a second cutaway view of the tensioning block attaching the strap to the end form.

With reference to FIGS. 1, 2 and 3, the trough-like solar reflector 100 shown uses only the metal strap 110 to tension the membrane 120 around the end form 130 peripheral edge 140. In conventional attachment means, the membrane is adhered to the inside of the metal strap using epoxy or similar adhesive. In the embodiment shown, unlike conventional means, the membrane is adhered to the top or outside surface 115 of the metal strap, so that when the membrane and strap are mounted on the end form and held in place, the bending of the strap around the end form puts the strap in tension, thus laterally tensioning the membrane. The strap material and geometry must be such that the strap has sufficient flexibility to bend elastically along its length around the end form but sufficient rigidity so as to not bend significantly along the its width. It will be noted that although a metal strap, for example $1/16$ inch aluminum or $1/16$ inch steel, has been conventionally used in trough reflectors, other materials, such as carbon composites, might be utilized.

When the membrane is attached to the inside surface of the strap, as in a conventional reflector design, the peripheral edge 140 of the end form 130 can describe ideal cross-sectional profile of the solar reflector 100. In the current invention, however, the cross-sectional profile of the end forms must be adjusted to compensate for the thickness of the metal strap 110, and any cushioning pads 150 that are under it, so that the outside strap surface 115 becomes the correct cross-sectional profile.

With specific reference to FIG. 2, a cross-section view of the end form 130 with a flexible rubber, plastic or similar resilient pad 150 between the end form 130 and the adjacent metal strap 110 is shown. The pad 150 acts as a cushion so that the metal strap 110 can be seated smoothly on the end form 130 allowing the strap to make a larger bend radius, which aids the strap in tensioning the membrane 120 which is on the outside surface 115. It also smoothes out any imperfections on the periphery of the end form 130. As described in U.S. Pat. No. 4,510,923, incorporated by reference herein, a series of pins 141 inserted through slots (not shown) in the strap 110 and into the end form 130 can be used to position the strap on the end form periphery.

Figure 4:
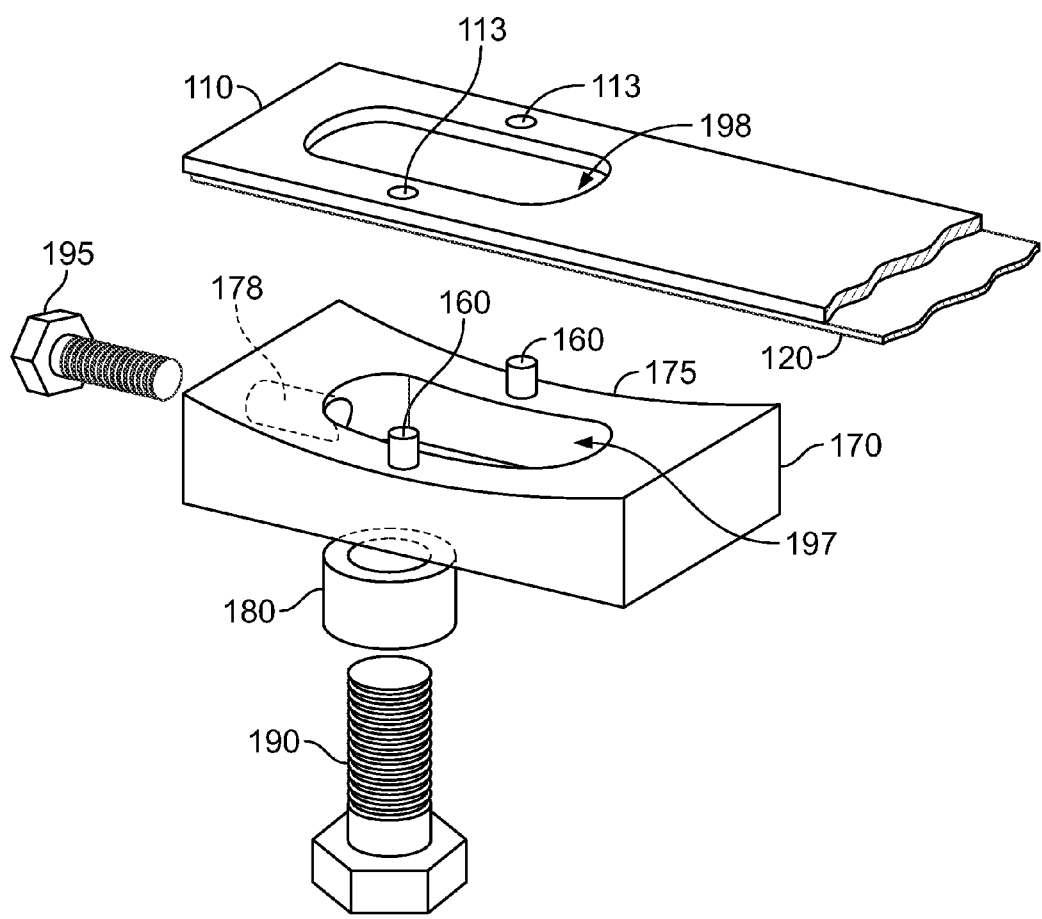
FIG. 4 shows an exploded view of the tensioning block and strap.

The strap can be held to the periphery of the end form by a number of fastening means. A preferred method is shown in FIGS. 3 and 4 in which a unique strap tensioning block 170 attaches to the strap 110 with two pins 160 that are inserted into two matching holes 113 in the strap 110. The pins 160 are used to hold the block 170 securely in place on the strap 110, allowing the tensioning block 170 to tighten the strap 110 on the end form 130. Modifications are possible. For example, rivets could replace the pins. A fastener, such as the attachment bolt 190 shown, and load transfer spacer 180 are then passed through the slots 197, 198 in the block and strap, respectively, and the bolt 190 is tightened to the end form 130, holding the tensioning block 170 in place. The tensioning screw 195 is then tightened down on the load transfer spacer 180 thereby pulling the strap 110 tightly around the end form 130.

The load transfer spacer's 180 function is to evenly distribute the force of the tensioning screw 195 on the attachment bolt 190, preventing the block 170 from twisting or riding up. The height of the load transfer spacer 180 is slightly thicker than the tensioning block 170, but not as thick as the block and strap together. It has the same inside diameter as the attachment bolt 190 and the same outside diameter as the tensioning block's slot 197.

FIG. 4 is an exploded view of the attachment block and strap. An important aspect of the tensioning block 170 is the curve on the inwardly facing surface 175. This curve matches the desired cross-sectional profile of the membrane 120 at that specific location and insures that the ends of the strap 110 and the longitudinal edges of the membrane 120 follow the contour of that profile. The curved surface 175 on the tensioning block 170 is a significant improvement over a conventional flat block which does not duplicate the desired profile at the ends of the end form, thus creating flat spots and misalignments at the longitudinal edges of the membrane 120 and corresponding loss of focal integrity.

Figure 6:
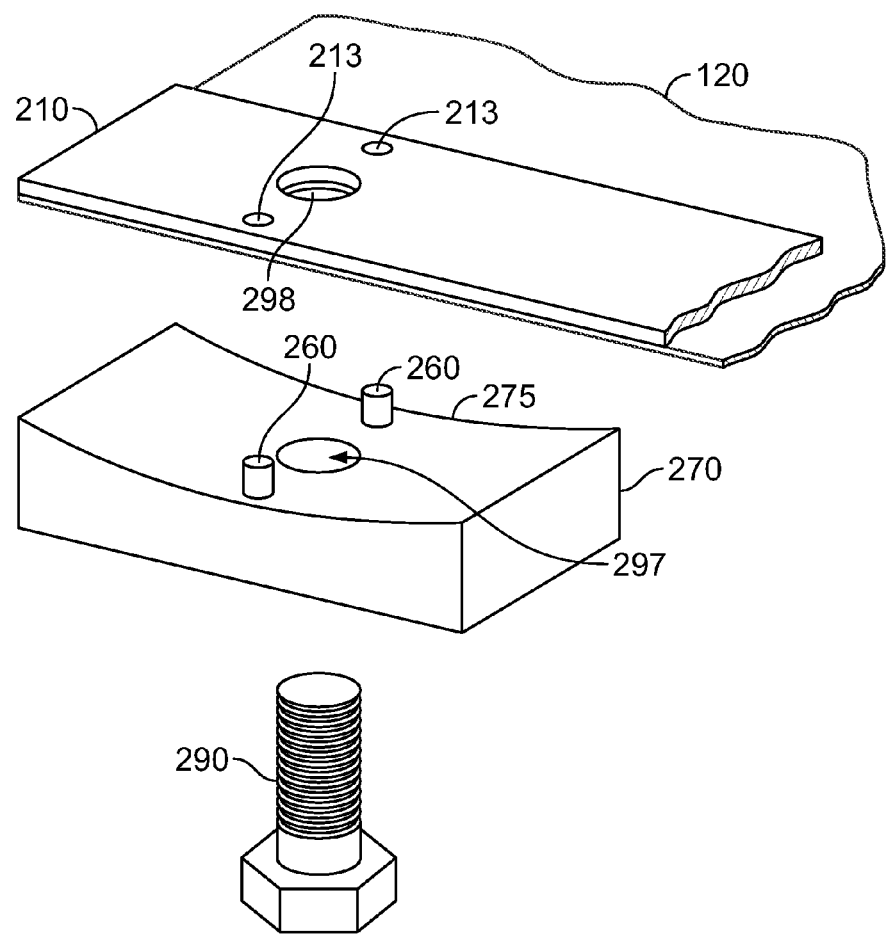
FIG. 6 shows an exploded view of an alternate tensioning block and strap.

Two tensioning blocks would normally be employed for each strap, one on each side of the reflector, although it would be possible to have an alternative form of attaching the strap to the end form at one end of the strap, including bolts or other fasteners. It is also possible to have different types of tensioning blocks which still include some of the same advantageous features described above. For example, with reference to FIG. 6, a fixed block 270, including a curved facing surface 275, may be held to a strap 210 with pins 260 and holes 213 in the manner described above but be fastened fixedly to the end form with a fastener, such as the attachment bolt 290, shown. The fixed block and associated strap end would have holes 297, 298 for the bolt 290 rather than slots 197, 198. The strap 210 could have a slot at the opposite end to accommodate a tensioning block design such as that shown in FIG. 4.

Figure 5:
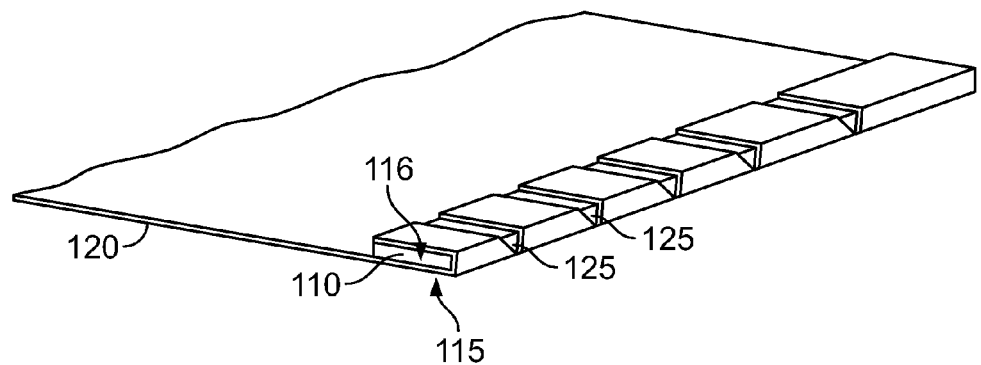
FIG. 5 shows the attachment of the membrane to the strap.

With reference to FIG. 5, attachment of the membrane 120 to the outside surface of the strap 110, while reducing the wrinkles and potential shape distortions that occur with attachment to the inner surface of the strap, presents a challenge in effective attachment of the membrane to the strap. In a conventional design, the membrane is sandwiched between the end form and the metal strap, which provides additional security and structural integrity. When the membrane is attached to the outside of the strap, however, it is of benefit to attach the membrane 120 to the outside surface 115 of the strap 110 near but not at the edge of the membrane so as to allow the edge of the membrane 120 to be wrapped around the strap 110 longitudinally. The end of the membrane 120 can then be attached to the inside surface 116 of the strap 110 providing a second plane of attachment to the strap as well as the structural stability of having the membrane sandwiched between the strap 110 and the end form 130.

However, since the strap 110 is bent around the end form 130 wrinkles in the membrane 120 on the inner surface 116 of the strap can still present a problem. While the tensioning effect of having the membrane attached to the outer surface 115 of the strap 110 reduces or eliminates wrinkles along the trough, wrinkles between the strap and the end form can cause the membrane and strap to be misaligned and may make it difficult to seat the strap smoothly on the end form. To overcome this problem, slots or cutouts 125 are placed along the edge of the membrane 120 to eliminate such wrinkles. For example, it is possible to use a series of symmetrical shaped cutouts positioned so that a vertex just touches the outer surface 115 of the strap 110. It would be clear to those of ordinary skill in the art that the angle of the vertices and the width of the cutouts necessary to eliminate wrinkles would be dependent on the radius of the end form and the width of the strap. Other shapes and configurations of cutouts could also be used.

It will be noted that even in reflector designs where the membrane is on the inner surface of the strap and is between the strap and the end form, wrapping the edge of the membrane around the strap and having a second plane of attachment on the outside of the strap can add structural stability. In such a design, cutouts along the edge of the membrane would still be used, not to prevent wrinkles, but to allow the edge of the membrane to expand as the strap is bent around the end form.

While the present invention has been shown and described with reference to the foregoing preferred embodiments, it will be apparent to those skilled in the art that changes in form, connection, and detail may be made therein without departing from the spirit and scope of the invention as defined in the appended claims.

We claim:

1. A solar reflector comprising:

a support structure;

a first form member attached to said support structure defining a first periphery and a second form member defining a second periphery;

a tensioned reflective membrane having a first edge held adjacent to the first periphery and a second edge held adjacent to the second periphery;

a flexible strap defining a first end and a second end and having an inner surface and a outer surface, wherein the membrane is adhered to the outer surface of the strap near the first edge of the membrane; and a first fastener, wherein the first fastener attaches the first end of the flexible strap to the first form member, the inner surface of the strap is positioned to be adjacent to the first periphery, and the strap lies along the first periphery;

a first tensioning block attached near the first end of the strap, wherein the first tensioning block defines a curved inner surface and a first opening adapted to receive the first fastener, the strap defines a first opening near the first end adapted to receive the first fastener, and the membrane defines a first opening near the first edge adapted to receive the first fastener;

and wherein the curved inner surface of the first tensioning block is positioned adjacent to the first edge of the membrane, the first fastener is inserted through the first opening in the first tensioning block, the first opening in the first edge of the membrane, and the first opening in the strap, and is attached to the first periphery, and wherein the first opening in the first tensioning block is a slot defining a longitudinal axis, the opening in the strap is a slot, and the opening in the membrane is a slot, and the first tensioning block further comprises:
  a tensioning screw, and
  a load transfer spacer, and the first tensioning block further defines a second opening, adapted to receive the tensioning screw, wherein the second opening intersects with the slot and the tensioning screw is substantially parallel to the longitudinal axis of the slot when the tensioning screw is inserted into the second opening;

and wherein the load transfer spacer is positioned on the first fastener and within the slot in the tension block, whereby the tensioning screw may be tightened against the load transfer spacer to adjust tension of the strap and the membrane.

2. The solar reflector of claim 1 wherein the first edge of membrane is wrapped around the strap and is adhered to the inner surface of the strap.

3. The solar reflector of claim 1 wherein the first edge of the membrane forms cutouts.

* * * * *